US007949135B2

(12) United States Patent
Lindholm et al.

(10) Patent No.: US 7,949,135 B2
(45) Date of Patent: May 24, 2011

(54) KEY DISTRIBUTION IN SYSTEMS FOR SELECTIVE ACCESS TO INFORMATION

(75) Inventors: Fredrik Lindholm, Älvsjö (SE); Gunnar Kreitz, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1047 days.

(21) Appl. No.: 11/718,953

(22) PCT Filed: Nov. 16, 2004

(86) PCT No.: PCT/SE2004/001676
§ 371 (c)(1), (2), (4) Date: May 9, 2007

(87) PCT Pub. No.: WO2006/054927
PCT Pub. Date: May 26, 2006

(65) Prior Publication Data
US 2008/0101611 A1    May 1, 2008

(51) Int. Cl.
*H04L 9/00* (2006.01)
(52) U.S. Cl. ............................ 380/277; 713/153; 726/26
(58) Field of Classification Search .................. 380/277
See application file for complete search history.

(56) References Cited

U.S. PATENT DOCUMENTS

| | | | |
|---|---|---|---|
| 5,748,736 A | 5/1998 | Mittra | |
| 6,832,314 B1 * | 12/2004 | Irvin | 713/162 |
| 2004/0017916 A1 * | 1/2004 | Staddon et al. | 380/277 |

FOREIGN PATENT DOCUMENTS
WO    WO 02060116    8/2002

OTHER PUBLICATIONS

Noar, Dalit; Naor, Moni; Lotspiech, Jeff, "Revocation and tracing schemes for stateless receivers", Electronic Colloquium on Computation Complexity, Report No. 43, Jul. 2002.*
Kikuchi, Hiroaki. Rabin Tree and Its Application to Broadcast Encryption. IPSJ SIG Technical Reports, Japan, Information Processing Society of Japan, Jul. 18, 2003, vol. 2003 No. 74 p. 9-12.
Nakagawa, Mai. Improvement of Subset Difference Method Using One-Way Function. IEICE Technical Report, Japan. The Institute of Electronics, Information and Communication Engineers. Sep. 2004, vol. 104 No. 315 p. 33-38.
Probabilistic Optimization of LKH-Based Multicast Key Distribution Schemes, A. Selcuk et al., Internet draft Jan. 2000, http://www.securemulticast.org/draft-selcuk-probabilistic-lkh-00.txt.
Key Management for Secure Multicast Group Communication in Mobile Networks, T. Kostas et al.. http://nevelex.com/downloads/discex.pdf.

* cited by examiner

*Primary Examiner* — Kimyen Vu
*Assistant Examiner* — Yogesh Paliwal

(57) ABSTRACT

A combination of stateless and state-full techniques enable reduced overall key management messages. A set of encryption keys is created based on a stateless subset cover scheme, where each user is associated with a leaf in the subset cover scheme. A state key and a corresponding state representing a subset of users that have the state key and a subset of users that do not have the state key is established, and a subset cover based on information representative of the established state is determined. Finally, a group key management message can be determined at least partly based on the calculated subset cover. The introduced state opens up for efficient subset cover calculation, reducing the size of the key management message.

38 Claims, 16 Drawing Sheets

|  | Average | Min | Max | Total | Average (incl. full SD) | Total (incl full SD) |
|---|---|---|---|---|---|---|
| Users | 10 401 | 1 547 | 32 768 |  | 10 401 |  |
| Keys | 957 | 603 | 26 930 | 153 228 | 1 733 | 277 293 |
| Packets | 16 | 11 | 449 | 2 637 | 29 | 4 705 |
| Data | 23 997 | 15 156 | 673 284 | 3 839 532 | 43 382 | 6 941 172 |
| Time using 64kbps | 3 | 1.89 | 84.16 | 480 | 5.42 | 867.65 |

Fig. 6

|  | Average | Min | Max | Total | Average (incl. full SD) | Total (incl full SD) |
|---|---|---|---|---|---|---|
| Users | 10 401 | 1 547 | 32 768 |  | 10 401 |  |
| Keys | 784 | 1 | 9 505 | 125 455 | 1 229 | 196 663 |
| Packets | 13 | 1 | 159 | 2 183 | 21 | 3 370 |
| Data | 19 660 | 108 | 237 684 | 3 145 740 | 30 787 | 4 925 952 |
| Time using 64kbps | 2.46 | 0.01 | 29.71 | 393.22 | 3.85 | 615.74 |

Fig. 7

```
Findset (Node n)
if ((not n.red) and (n.black = 0))
    if (n = root)
        return Full_Tree_Set;
    else
        return (parent(n), sibling(n))
if (not left(n).blue)
    return Findset(right(n))
if (not right(n).blue)
    return Findset(left(n))
top := n
bottom := n
while(bottom.blue)
    if(left(bottom).red)
        bottom := left(bottom)
    elseif (right(bottom).red)
        bottom := right(bottom)
    elseif(left(bottom).black ≥ right(bottom).black)
        bottom := left(bottom)
    else
        bottom := right(bottom)
return (top, bottom)
```

Fig. 9

```
Cover()
Ret := ∅
for(lev = depth-1 to 1)
    foreach(node n on level lev)
        if(((left(n).red) and (right(n).red) and (left(n).blue or right(n).blue))
            if(left(n).blue)
                Ret := Ret ∪ Findset(left(n))
            if(right(n).blue)
                Ret := Ret ∪ Findset(right(n))
            n.red := true
        else
            n.red := left(n).red | right(n).red
            n.blue := left(n).blue | right(n).blue
            if(n.blue)
                n.black := max(left(n).black, right(n).black)
            else
                n.black := left(n).black + right(n).black
if(root.blue)
    Ret := Ret ∪ Findset(root)
return Ret
```

Fig. 10

KEY DISTRIBUTION IN SYSTEMS FOR SELECTIVE ACCESS TO INFORMATION

TECHNICAL FIELD OF THE INVENTION

The present invention generally relates to key management in systems for selective access to information, and more specifically to distribution of key messages for derivation of a media key or equivalent for decoding e.g. secure broadcast, as well as optimization of such key messages.

BACKGROUND OF THE INVENTION

Key management is of crucial importance in any system for selective access to information, such as broadcast or multicast protection systems. Broadcast and multicast enables efficient distribution of protected information to large groups of receivers, as schematically illustrated in FIG. 1, for both wireless applications and standard data communications. In the following the term broadcast will be used to refer to both broadcast and multicast. Recent efforts focus on broadcast over wireless networks and a key topic is to use the wireless link as efficiently as possible, for example to reduce time for media access. Another topic of key interest is to provide secure broadcast. Thus, encryption of protected information is an important enabler for commercial broadcast services. Commercial broadcast involve several parties, e.g. the users receiving broadcasted protected information, the network provider, and the content provider. In order to direct broadcast only to users that fulfill the commercial requirements the content provider provides valid encryption keys to these users in a key distribution process. As the group of active listeners is dynamic and changing over time the update of keys becomes an important topic. From a user point of view it is important that a key update is fast, eliminating annoying waiting time. From the point of view of network provider and/or content provider it is also important that a key update is made as fast and efficient as possible to save valuable wireless resources.

Broadcast protection systems normally operate with a number of distinguished steps. A service registration step is usually required in which a user enters an agreement with a service provider. In this step the user is provided with a personal, unique and secret key. In a key-distribution step a media key (or more generally an information protection key) is distributed to registered users for decryption of broadcast protected information. The service provider encrypts the protected information in a media delivery protection step. A re-key step is required to update the protected information key, e.g. when a new user is registered, a user de-registers or when a media key is compromised. Periodic re-key may also be used to increase the security of the system. Service registration is usually point-to-point between a user and a content provider and may use any secure and authenticated means for communication. Key-distribution and media delivery protection (MDP) will be executed in a one-to-many fashion.

The main problem with key-distribution is to update the MDP-key as fast as possible when new users either join or leave the group in a way, which is scalable to large groups. The naive approach of sending the updated MDP-key encrypted individually for each user does not scale well and it is resource consuming, increasing both computational cost and bandwidth consumption.

There are schemes proposed, referred to as group-key distribution protocols to improve scalability e.g. LKH (Logical Key Hierarchy), SD (Subset Difference) and LSD (Layered Subset Difference). These are examples of hierarchical group key distribution protocols.

To each hierarchical group key distribution protocol there is an associated set of encryption keys. An abstract hierarchical tree can be used in order to illustrate the arrangement of these keys and the relationship between the keys. FIG. 2 illustrates a hierarchical tree with a set of users, $U_1$ to $U_8$, at the bottom. At the top of the hierarchy there is the output key $K_M$ of the specific hierarchical protocol. A subgroup of the complete group of users determines a sub-tree of the hierarchical tree that in turn determines a group key management message comprising a set of identifiable message elements. The nodes in the tree model in between the bottom and top levels are associated with encryption keys required for decrypting elements of the group key management message. Each user receives, in an initiation phase, information for deriving a subset of these keys, e.g. all keys on the path between the particular user $M_i$ and the $K_M$. The hierarchical group key distribution protocols provide linear initial keying performance and improved logarithmic re-key performance. These methods are the most scalable and efficient ones because of the non-linear performance.

FIG. 2 can conveniently be used to discuss the LKH method. The LKH method is a scalable group-key distribution protocol, which is based on the approach of associating every node (i) in a tree with a key $K_i$ where (i) is an index in one or several dimensions. The root key, $K_M$ is the key associated with the top level of the tree and it is used as the MDP-key. Every user in the group of users is provided with individual keys, e.g. in a registration phase, and these keys are associated with the leaves $K_{(rst)}$ at the bottom of the tree. Every user also receives all the keys lying on the path from its leaf up to the root. A typical message is made of triplets {i, j, $[K_i]_{K_j}$}, where i>j denoting that node i is an ancestor to node j. A user can decrypt the message part if j is on the path up to the root i.e. $K_i$ can be retrieved by use of the key $K_j$ associated with node j. Thus, the set of $K_i$ comprises hierarchical encryptions of the root key $K_M$. When updating the MDP-key because of a joining or leaving user, the numbers of required messages are few, as well as the message size. A possible drawback is that the system is state-full or state-dependent, i.e. the algorithm makes use of the previous group key to encrypt the new generated group key. Therefore, the dependency of state is required for the scheme. In the case the group key for a certain state is lost it is not possible for the participant to easily re-catch the session by any means.

Another drawback is that a provided method for batch re-keying, i.e. batch update of keys, is not very efficient in particular at times of major and momentary changes of user status.

The Subset Cover algorithms is a general class of group-key distribution protocols, characterized in that a group user is associated with a subset of users, the subset being associated with a particular key. The Subset Difference (SD) protocol, illustrated in FIG. 3, is an example of these protocols. With reference to FIG. 3 the nodes are numbered with an index j. Exemplary in FIG. 3 the nodes 1-15 are indicated. A collection of subsets $S_{i,j}$ covers the complete group and distinctly determines the set of all users. $S_{i,j}$ denotes the set of leaves under node i but not under node j. In FIG. 3 the sets $S_{2,5}$ and $S_{3,12}$ are illustrated. When updating the MDP key, the group of users is exactly covered with these subsets, and the updated key is encrypted under each of the subset keys. The SD (Subset Difference) scheme is a stateless group-key distribution protocol, as is the more general subset cover (SC) protocol. The SD scheme creates a binary tree with as many leaves as possible users. The number of leaves in a structure is fixed. Some leaves are occupied by active users, some with revoked users or users having left the broadcast, and some leaves are not occupied but free for new users to join the broadcast. The key server (KS) creates the set S of entities $S_{i,j}$. Every $S_{i,j}$ is also uniquely associated with a key $L_{ij}$, which every user of the set $S_{i,j}$ can compute, but no other group user. The MDP-key can be updated to a particular set $S_{i,j}$ by encrypting it using $L_{ij}$. It should be noted that this has to be done for every $S_{i,j}$ belonging to S. The $L_{ij}$'s are created in a hierarchical fashion, where a random seed associated with the node i is extended to nodes j>i using a one-way function iteratively.

The LSD (Layered Subset Difference) scheme is a SD scheme, but with special layers such that every possible user needs to store fewer keys than in the original scheme.

In all these systems, the group key management message that is broadcasted to all users is quite large.

Reference [1] discloses a stateless hierarchical method based on subset cover of the group of users.

The size of a key management message tends to become very large in large groups. Therefore, various attempts have been made to make the broadcast of a key management message as efficient as possible. Reference [2] discloses a method to arrange the users in dependence of the probability that a user will be compromised thereby allowing for an increased efficiency of the key management system.

Because of the size of a key management message it would be very resource consuming to frequently multicast or broadcast such messages over a cellular network. There is also a question which party would finance the expensive radio link resources required to transmit the messages. References [3, 4] advice a distributed system of entities each entity managing a subgroup of the full group. Each subgroup is further associated with a separate group key. Although these systems provide scalability they become complex and expensive. Another problem with the cited methods is related to distribution of security functionality to another entity whereby such other entity must be trusted to securely handle the security functionality. This makes such systems more exposed to compromise. As a consequence, such systems do not manage optimizations done by entities not trusted with keys or other secret information.

In addition there are practical problems arising when keys are to be distributed relating to more than one media session at the same time. An example could be a service provider that offers a plurality of channels independently selected. The systems referred to above do not provide an easy manner to manage multiple channels and where each of these may be turned on and off by a user as desired. The naive method would be to use a separate system for each channel, which, however, would be very inefficient.

A disadvantage of stateless schemes such as SD is that at every key update, the size of the key management message depends on the total number of users revoked from the system. Thus, if only one user shall be revoked in a key update, the message size still depends on the total number of users that have already been revoked. In the state-full LKH system, the revocation of one user does not depend on the total number of already revoked users, but is instead dependent on the logarithmic number of existing users.

Thus, there is a need for an efficient and reliable method for group-key distribution in broadcast and multicast systems that overcome the drawbacks of prior art systems. In particular there is a need for a method that provides for optimization of the message size.

SUMMARY OF THE INVENTION

The present invention overcomes these and other drawbacks of the prior art arrangements.

It is a general object of the present invention to provide an efficient method for group-key distribution among a group of users for selective access to protected information such as in broadcast protection systems.

It is an object to create a key management system comprising a set of encryption keys, analogous to a stateless subset cover scheme, and provide improvements enabling reduction of overall key management messages.

It is an object to create an arrangement for improved key distribution in a system for selected access to information.

It is a specific object to create, within an arrangement for improved key distribution, a user terminal for receiving and storing a subset of encryption keys and a state key.

Another object is to significantly reduce the size of a group key management message while maintaining an acceptable security level.

It is an object to optimize the creation of subsets of users thereby reducing the size of a key management message directed to the subset of users.

It is a further specific object to efficiently manage multiple content keys, each associated with a service.

Still another object is to reduce the computational overhead at the key distribution server related to the cryptographic calculations required in a secure group-key distribution system.

These and other objects are met by the invention as defined by the accompanying patent claims.

Briefly, the invention proposes a powerful and inventive combination of stateless and state-full techniques to enable reduced overall key management messages. A set of encryption keys is initially created based on a stateless subset cover scheme, where each user is associated with a leaf in the subset cover scheme. A basic idea according to the invention is then to establish a state key and a corresponding state representing a subset of users that have the state key and a subset of users that do not have the state key, and determine a subset cover based on information representative of the established state. Finally, a group key management message can be determined at least partly based on the calculated subset cover. The introduced state opens up for efficient subset cover calculation, reducing the size of the key management message.

In other words, the invention involves establishing a state T and a state key $K_{state}$ to combine stateless and state-full techniques. According to the invention, a dynamic system is created which provides both reduced overall key management messages and a possibility to handle keys for multiple services. More precisely, the invention combines the two approaches (stateless and state dependent) to create a system wherein revocation is in general only dependent on the number of users being revoked in a key update process. To achieve this, a new system is created that is based on a subset cover based system, such as SD or LSD. In addition to the keys involved in a traditional subset cover system a user normally receives at initialization a state identity T and a state key $K_{state}$. According to the invention, means are preferably included to register users that already have been revoked and their state and state key at the time for revocation. Thus, when a user shall be revoked or re-activated, it would be possible to create a key management message that only depends on that particular user. By introducing a state comprising a state identifier and a state key it is possible to include in a key management message only those who are currently concerned, e.g. being revoked. According to the invention, a new algorithm is preferably used for calculating the update set that decreases the number of total sets.

It is noted that the disadvantages of prior art state dependent systems, e.g. LKH, are reduced in that a full update of the system can always be done using the underlying stateless SD-system to re-define state and encryption keys.

The method according to the invention offers the following advantages:

Reduced number of keys needed in a particular update.
Reduced number of data packets needed for sending update.
Reduced time for update.
Possibility to revert to a normal state-less subset cover scheme.
Provision for handling multiple service keys.

Simulations have shown that, under certain circumstances, a message size reduction of 90% can be obtained by the inventive method.

Other advantages offered by the present invention will be appreciated upon reading of the below description of the embodiments of the invention.

BRIEF DESCRIPTION OF THE DRAWINGS

The invention, together with further objects and advantages thereof, will be best understood by reference to the following description taken together with the accompanying drawings, in which:

FIG. 6 is a table of data received from a simulation based on a prior art SD method.

FIG. 7 is a table of data received from a simulation based on the inventive method.

FIG. 9 is an exemplary pseudo code illustrating the inventive method.

FIG. 10 is a complementary pseudo code illustrating the inventive method.

DETAILED DESCRIPTION OF EMBODIMENTS OF THE INVENTION

Figure 1:
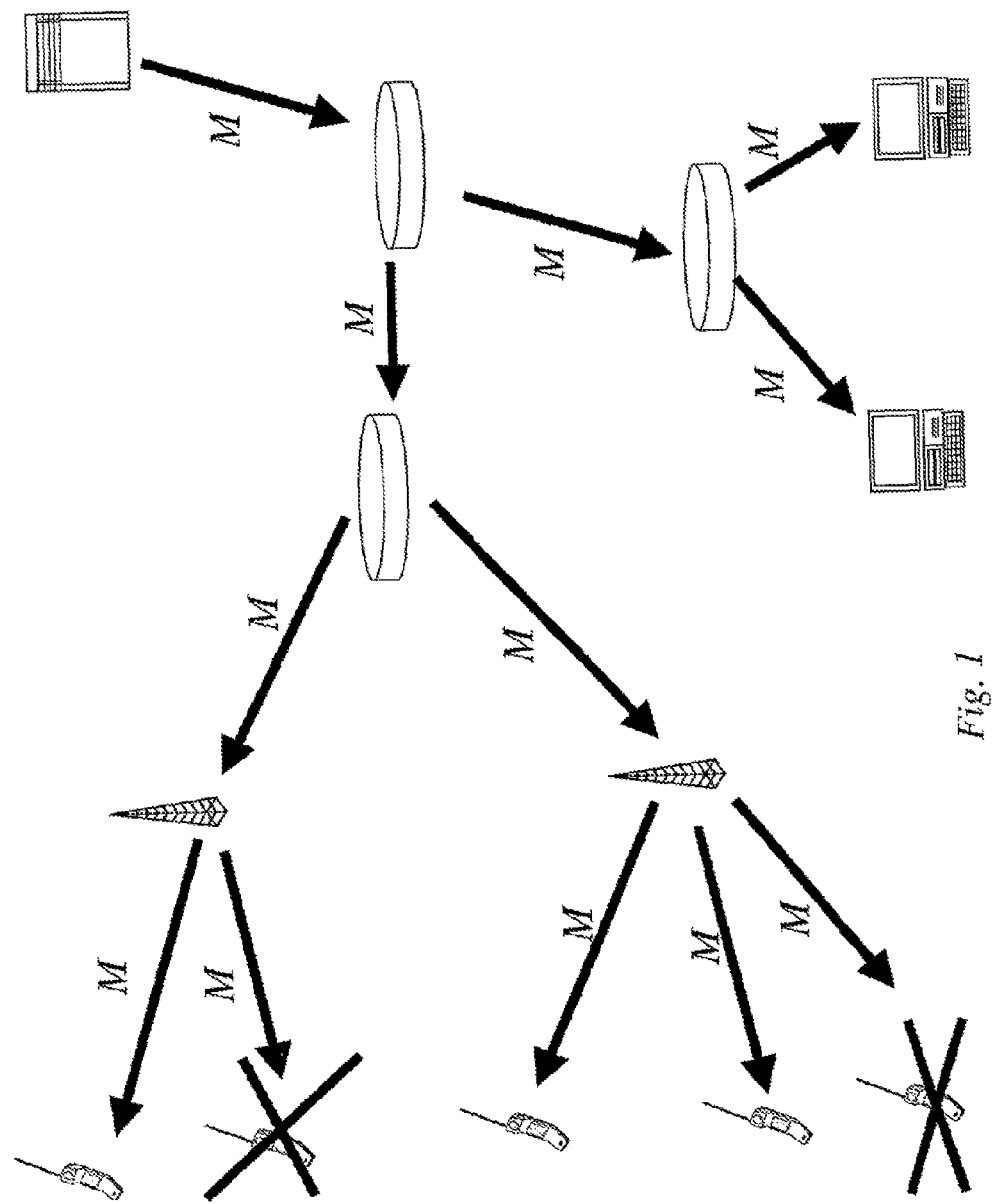
FIG. 1 is an exemplary overview network for distribution of a group key management message.
Figure 2:
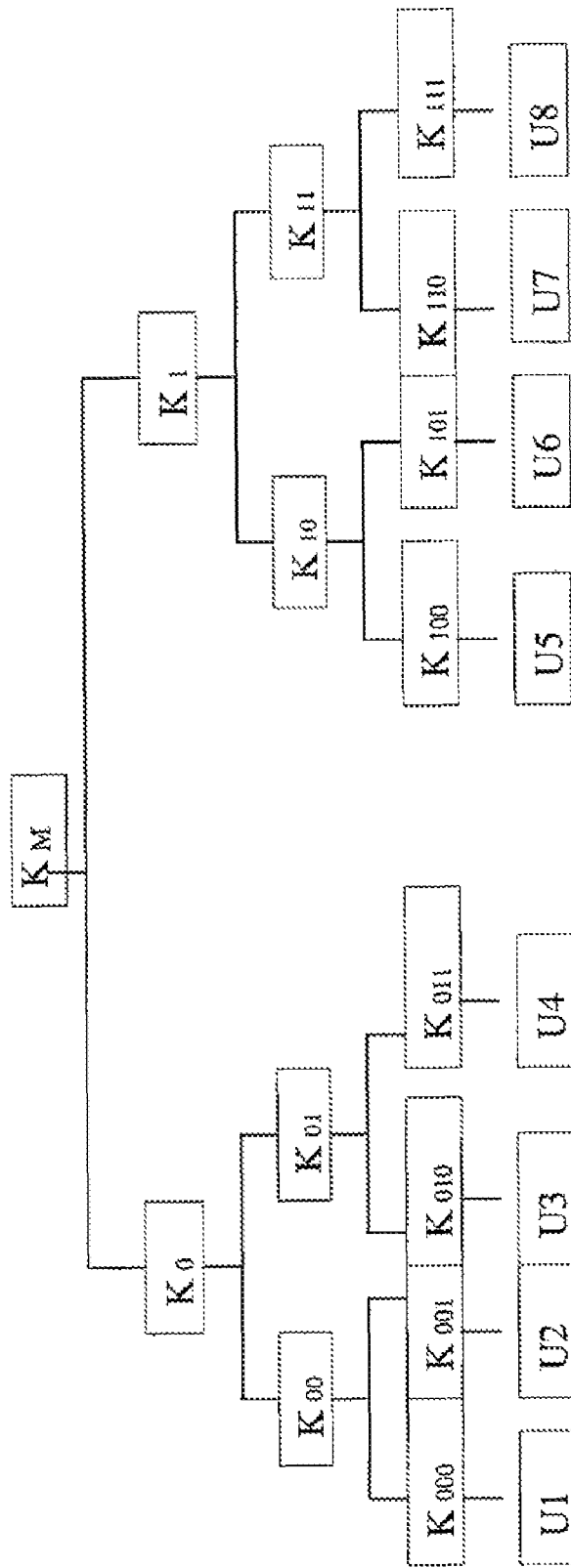
FIG. 2 is a logical tree representative of prior art hierarchical system for adaptation of group key management message to a specific user group.

A preferred embodiment will now be described based on an underlying SD structure. However, as will be appreciated by a person skilled in the art, any stateless subset cover system for distribution of key management messages can be used with the invention whereby any two such implementations may differ in the detailed structure.

Preliminaries

FIG. 6 shows data from simulations. FIG. 6 illustrates use of a normal SD in which the maximum number of users was $2^{15}$. The dynamic of the system in table 1 was set to around 1%, that is, except the "normal" users leaving the system for the simulation as such, it has been assumed that 1% of the current users are replaced at random between re-keying. FIG. 7 illustrates use of the method according to the invention under the same conditions. In this simulation, a full SD message was sent every 10th period in time, which affects the average and maximum values.

FIG. 7 shows that the messages in average, according to the inventive method, are less than 10% of those obtained in a normal SD method.

From the way the inventive method is constructed it has properties characteristic of both state-full and stateless systems. Thus, if the state is left unchanged throughout key updates the system is similar to a stateless system. Throughout this document this property is called semi stateless. On the other hand, if a user loses the state key it can no longer receive key updates and the system is characteristic of a state-full system. Again, this situation can be remedied by performing a full update, according to the invention, a possibility that depends on the state-less properties of the system. Although the inventive system can be regarded as an evolvement of an underlying SD structure it can equally well be described as a completely new system. From the point of view of identifying inventiveness the first approach is convenient allowing a clear borderline between known subject matter and novel features.

It is noted that the invention does not solve all security problems. The mechanism allows, under certain circumstances, for the possibility for an excluded user, not in possession of the state key, to "cooperate" with another excluded user who has the state key in order to retrieve the media key (or more generally an information protection key). This is however a calculated risk, which is seen as acceptable in practice. In fact, using a full update of the system according to traditional methods reduces the impact of this issue.

Throughout the drawings, the same reference characters will be used for corresponding or similar elements.

The following notations will be used related to subset cover algorithms based on tree structure, such as SD and LSD:

$$M = \{S_{ij}, E(H_{Sij}, K_M) \ldots S_{kl}, E(H_{Skl}, K_M)\}$$

Here M is the key management message and $S_{xy}$ defines a specific subset of users who can derive the necessary key $H_{Sxy}$ in order to decrypt the corresponding $E(H_{Sxy}, K_M)$ to obtain the media key, or more generally $K_M$.

The system, according to the invention, has a state and a corresponding state key $K_{state}$. Although the state key uniquely defines the system state it is convenient to use the pair $(T, K_{state})$ to define the system state. Here T is any suitable state identifier.

Any subset cover scheme has an associated complete set of objects, in this document referred to as leaves. A particular subset of a subset cover scheme is associated with a corresponding subset of the complete set of leaves.

By user shall be understood a person, system, or device that potentially can be granted access to protected information.

Each user can be associated with a leaf. The association of a user with a leaf is made in a registering process, e.g. registering a person as user of an information service.

Active users are those users who are currently access to protected information and who are therefore supported by the system with the prerequisites for decoding such encrypted information.

The process of providing a user with key information valid for access to protected information is hereinafter referred to as joining the user.

By revocation of a user shall be understood the process of distributing a new information protection key to all users but the revoked user. Thus, a revoked user has a state and a state key, which however, is no longer valid for access to protected information.

An update process that does not involve a state change shall be called soft whereas a process involving a state change shall be called hard. Because of the possibility of soft updates the method according to the invention is sometimes, in this document, referred to as semi state-less.

The following notations will be used throughout this document:

P denotes all potential users i.e. users associated with a leaf in the tree.

$U_A$ denotes active users who will remain active and previously revoked users who shall be joined to the active users and who have the current state key.

$U_J$ denotes users without the state key, or the state key is obsolete, to be joined as active.

$U_R$ denotes users who have the state key and who are either already revoked or shall be revoked in the current update.

$U_O$ denotes users who are revoked and who do not have the current state key.

It is appropriate at this point to provide some clarifications related to the above definitions of user sets. Regarding the set $U_A$ it is noted that a revoked user may still be in the current state if no state change has occurred since the revocation, i.e. no hard updates have been made.

The set $U_J$ includes previously revoked users but in the case that the state has changed since the revocation whereby the state key that these users have is not the same as the current state key. In addition, this set includes users who have not previously been active and, obviously, do not have any previous state key at all.

Cover (A, B) makes a covering where everyone in A is covered and users in B are covered conditionally. Determining users in B, if any, who shall be covered is part of algorithm for creation of relevant sets as will be explained further on. Users in P\(A∪B) are not covered. Here the notation X\Y denotes the set X with exclusion of the set Y.

Figure 3:
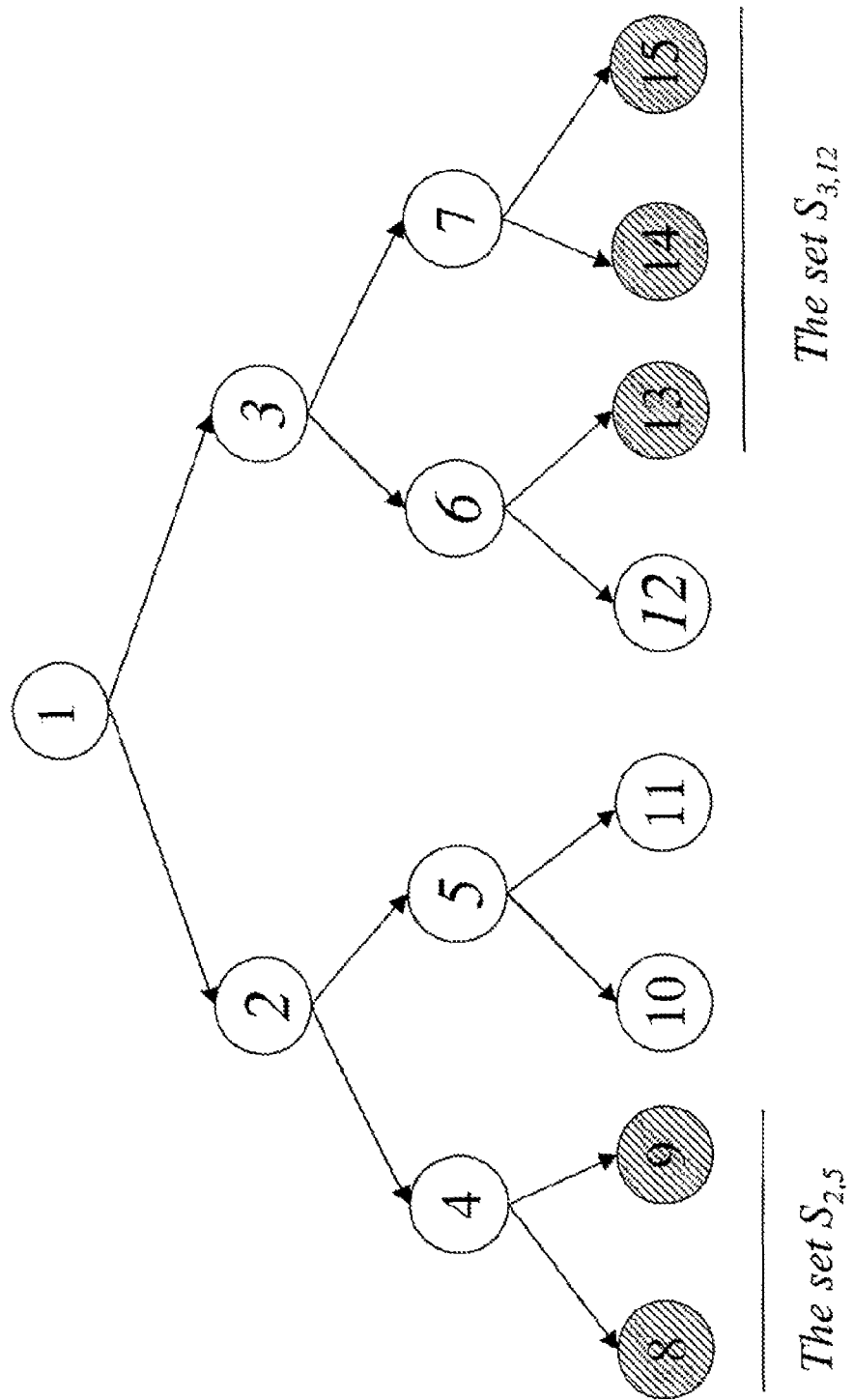
FIG. 3 is another logical tree example of prior art hierarchical system.

An example will now be discussed to illustrate the type of optimization that can be achieved according to the invention. With reference to FIG. 3 assume that the three users 10, 11, 12 have been revoked using the sets $S_{2,5}$ and $S_{3,12}$. Assume further that user 13 should thereafter be revoked as well. To do this securely in a traditional subset cover scheme, use of the sets $S_{2,5}$ and $S_{3,6}$ would be required in order to cover the active users and thus revoke all other users. However, in a system according to the invention only one set would be needed dependent only on the users currently being revoked.

Figure 4:
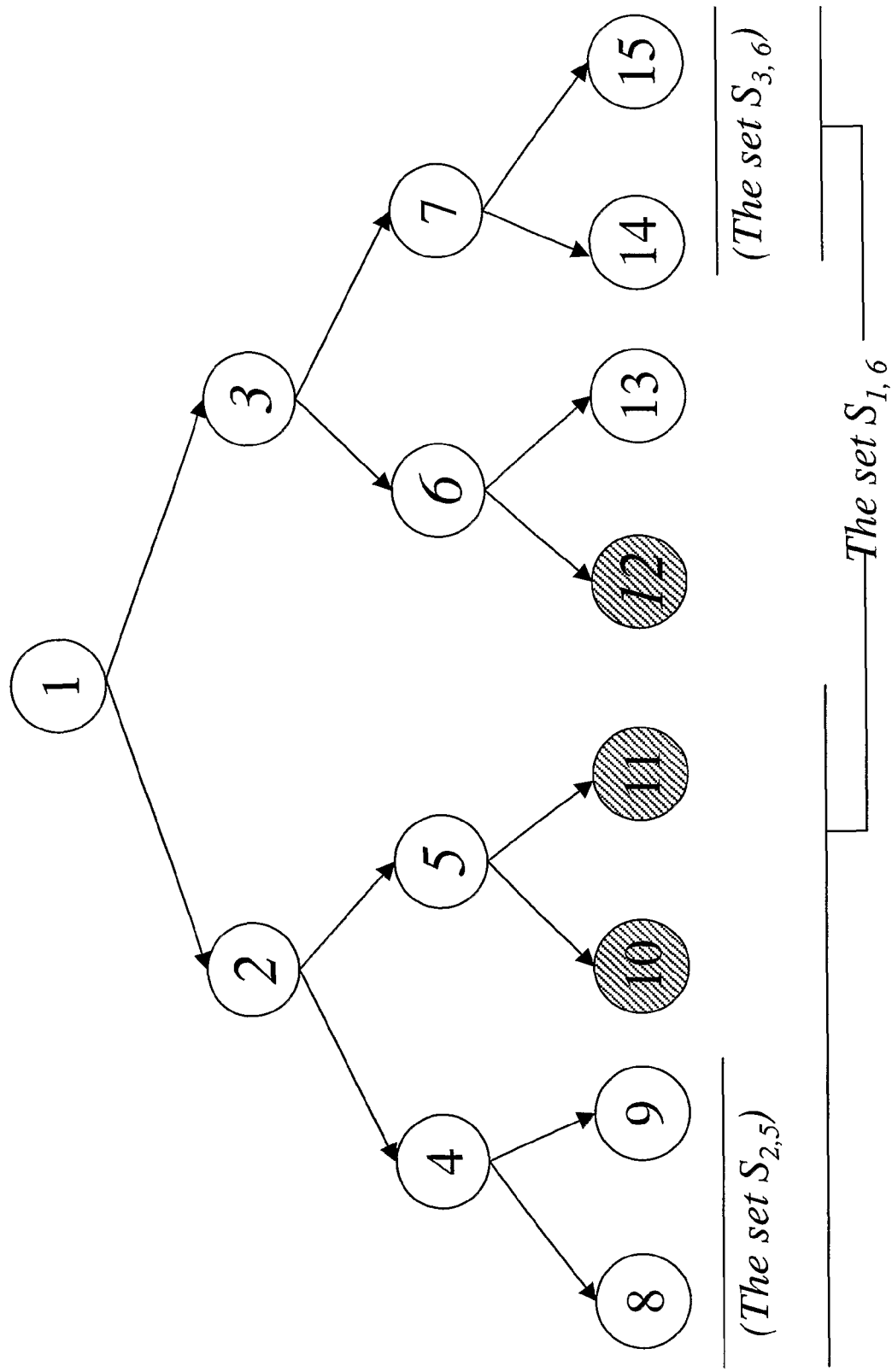
FIG. 4 is a logical tree example illustrating the inventive method.

In the example FIG. 4, illustrating the inventive method, it can be seen that only one set ($S_{1,6}$) is needed to do the revocation of user 13 whereas the normal algorithm required two sets. Note that in a normal SD protocol, a message directed to the set $S_{1,6}$ would allow the previously excluded users under node 5 to listen in. However, according to the inventive protocol they are prevented to do so because users under node 5 do not have the current state key and, thus, they cannot interpret the message.

DETAILED DESCRIPTION

In the following description a SD structure is exemplary assumed, however, a skilled person will appreciate that any stateless scheme can be used.

Figure 5A:
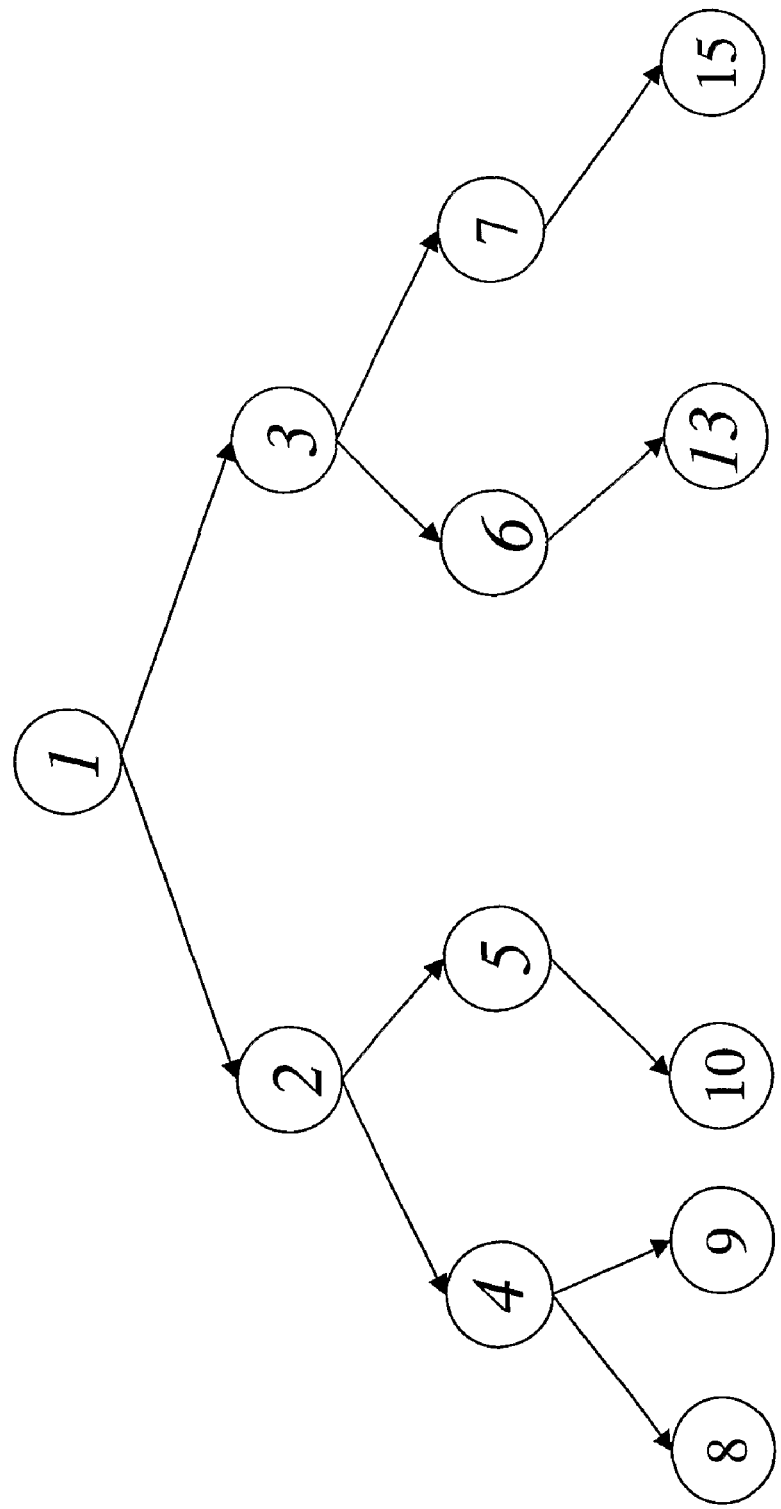
FIGS. 5A, 5B, and 5C are logical tree examples illustrating the inventive method.

The key server handling the system initially creates a normal subset cover based key structure. Basically a logical tree is created where different keys are associated with different nodes in the tree. Each user is associated with a leaf at the bottom level. Exemplary user is a human listening to a broadcast, a system, or generally any consumer of services. The key server keeps track at least of the tree structure, the keys associated to the tree, a list U of all leaves with associated users as well as leaves which are not yet associated with any user. In addition, the system must keep lists $U_R$, $U_A$ and $U_J$ updated. For a specific state, all active users and the key server need to have the state key. Whenever a new state is created in the system, the state key is updated. An active user, who shall remain active, receives an update message including new state, state key and media key. Users who are joined to the group of active users and who do not have a state key, receives an update message of a form characteristic of a state-less system recalling the properties of the inventive system. The state T and the state key form a representation of the group of active users. It is sometimes useful to define a tree structure that corresponds to a specific state T by excluding from an ordinary state-less tree those leaves that do not have the current state key. FIG. 5A shows an example of a state where at the given moment the tree is only formed by five leaves. The corresponding structure according to known hierarchical methods would have had eight leaves. The missing leaves are those that are not associated with the current state T. These leaves will also be referred to in this document as being undefined. Introduction of the state T thus defines the topology. It will be shown that introduction of state T allows the size of the key management message to be reduced.

Initialization

The SD parameters and possibly other parameters are provided to a user device in a configuration phase e.g. through an automated registration protocol or a smart card. The state key can be delivered to the active users in different ways. Advantageously it is delivered in the configuration phase. Alternatively a state key initialization is done by a full system update according to FIG. 3, where the subset cover algorithm is executed in its normal mode. The state key is then delivered to all active users possibly together with a media key. The key management initialization message would look like:

$$M = \{S_{ij}, E(H_{Sij}, T\|K_{state}\|K_M) \ldots S_{kl}, E(H_{Skl}, T\|K_{state}\|K_M)\}$$

Here $\|$ denotes concatenation. As $T\|K_{state}\|K_M$ is encrypted several times and, in fact, may contain some additional information it can sometimes be more convenient to use a envelope approach so that these keys are only encrypted once. Using an envelope the message would look as follows:

$$M = \{T, S_{ij}, E(H_{Sij}, K_E) \ldots S_{kl}, E(H_{Skl}, K_E), E(K_E, T\|K_{state}\|K_M)\} \quad \text{(Eq 1)}$$

Here $K_E$ is an envelope key used to encrypt $T\|K_{state}\|K_M$. For simplicity, we will in the rest of this document use this latter envelope approach when describing the key management message.

An Exemplary General Method

An exemplary general method according to the invention is now described with reference to FIG. 8. Generally, a system update involves two different types of users, each type corresponding to a user set. A first set $U_A$ denotes currently active users who will remain active and joining users who have the state key. A second set $U_J$ comprises new users who shall be joined in the update. These users do not possess a state key or the state key is obsolete. A third set $U_R$ comprises revoked users who have the state key and who are either already revoked or shall be revoked in the current update. The three sets of users are input to an algorithm for determining a corresponding subset cover. There are several solutions to the problem of optimizing the subset cover as will be apparent from the alternative embodiments disclosed later in this document.

Figure 8:
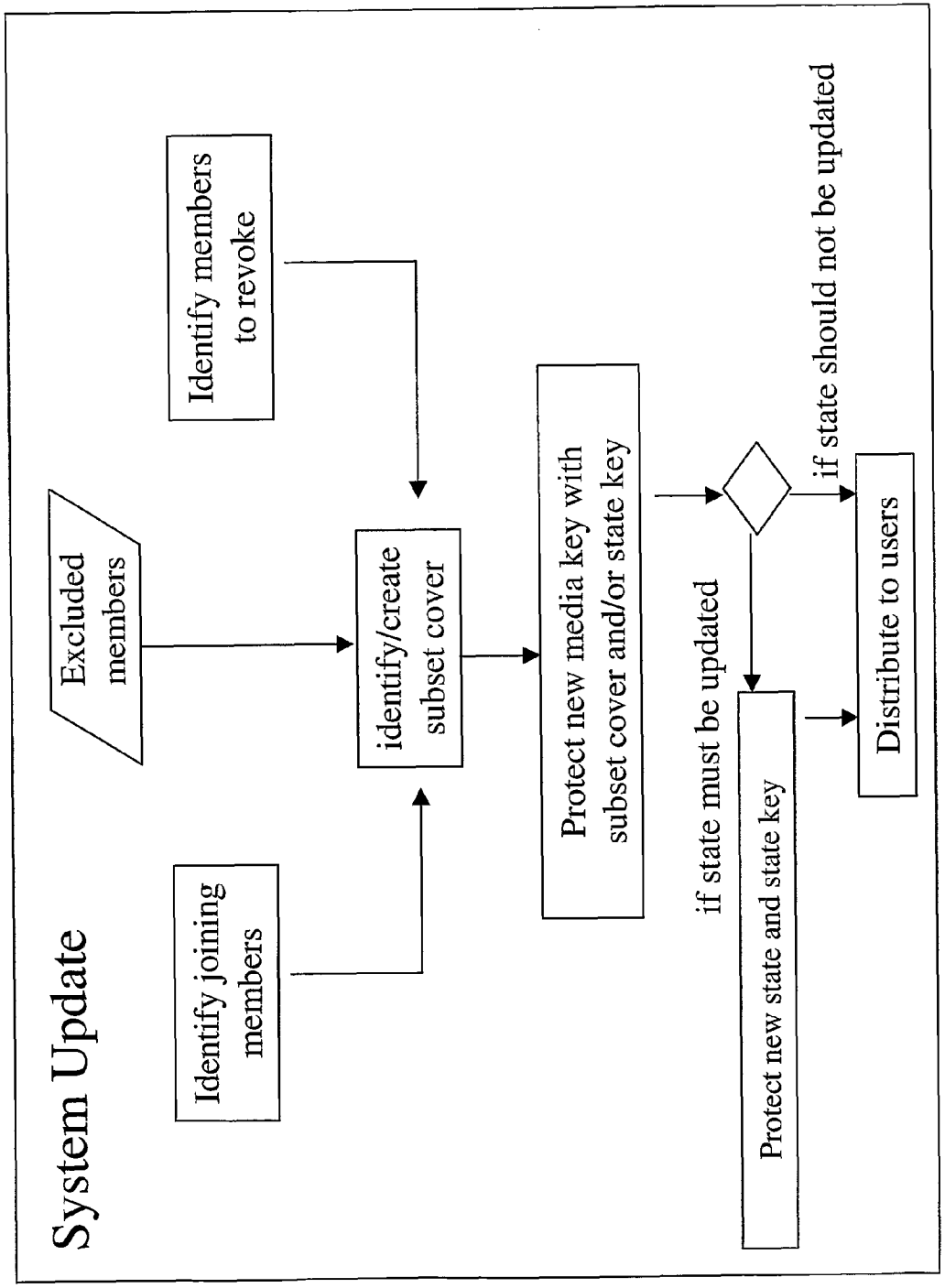
FIG. 8 is a flow chart illustrating an embodiment according to the invention.

The next step in the flow chart provided in FIG. 8 involves creation of a key management message that protects the new media key to be distributed. Generally, according to the invention, the protection includes use of the current state key.

Thereafter, the flow chart separates into two branches. The one branch is followed if the state key is not updated in the update process, i.e. a soft update. Then the key management message, created in the previous step, need no further modifications. The other branch involves update of the state and the state key what is referred in this document as a hard update. In this case the new state key must also be protected.

The revocation and joining of users can be performed either in response to certain events or periodically e.g. once every hour. Exemplary events that can initiate an update process include a user requesting to be excluded from the group or included therein, a user ceasing to pay subscription fee, or issued report regarding loss of key either manually by the user or automatically generated by user device. An update process can include collection of a batch of users to be processed.

Generally, an update process may involve simultaneously new users joining and active users being revoked. Again, it is noticed that some users being processed may not possess the state key.

Next, the general structure of a key management message will be described that properly addresses users who shall be updated with a new media key and, possibly, a new state and state key.

It facilitates understanding of this embodiment to imagine two independent tree structures that are being updated in parallel. The first of these structures contains all those users who do not possess the state key, i.e. new users not previously active, and revoked users with obsolete state key to be joined. The second structure contains all users who have the state key.

Joining Users

We first consider the case of users who do not have the state key and the joining of these to become active users. To address the joining users only, we note that this could be done viewing the joining users, as were they the only active users in the tree, and the active users ($U_A$) seen as undefined, all others being revoked. The set $S_A = \{S_{ab} \ldots S_{cd}\}$ can then be calculated such that all of $U_J$ is covered and possibly some of $U_A$. The respective keys $H_{Sab}$ are derived and the message addressed to $S_A$ will then look like:

$$M = \{S_{ab}, E(H_{Sab}, K_E) \ldots S_{cd}, E(H_{Scd}, K_E), E(K_E, K_M)\} \quad (Eq\ 2)$$

In Eq 2, E denotes the envelope encryption previously introduced.

It may be advantageous to provide joined users with both the media key and the new state key. In such case Eq. 2' may be used instead of Eq. 2:

$$M = \{S_{ab}, E(H_{Sab}, K_E) \ldots S_{cd}, E(H_{Scd}, K_E), E(K_E, T\|K'_{state}\|K_M)\} \quad (Eq\ 2')$$

Updating Users Having the State Key

We now turn to the second structure containing all users who possess the current state key. It is noticed, assuming no revocations (i.e. $U_R$ is empty) have taken place among those already possessing the state key, that the active users of the group can be addressed securely by encrypting the message using the current state key. Hence, the new media key can be sent using the current state key, i.e.:

$$M = \{T, E(K_{state}, K_M)\} \quad (Eq\ 3)$$

A new state key may be included in this message, which then becomes:

$$M = \{T, E(K_{state}, T\|K'_{state}\|K_M)\} \quad (Eq\ 3')$$

Revoking Users in Current State and Update of Users Remaining Active

In order to address the case when the set $U_R$ is not empty, a set $S_T = \{S_{rs} \ldots S_{tu}\}$ is calculated covering the users, with state key T, i.e. $U_A$, who shall remain active among all those having the current state key $K_{state}$. For this covering, revoked users are treated as undefined. Recalling FIG. 5A it is noticed that a set $S_{rs}$ may include users that are not in the state T. In order to address only those users that are in state T and simultaneously in the cover $S_R$ a new key $K_P$ is introduced and protected by the keys $H_{Srs}$. The envelope key $K_E$ is then obtained by using a function F with $K_P$ and $K_{state}$ as input. Examples of such functions are pseudo-random functions, message authentication codes, and cryptographic transforms. The function F can e.g. be provided to a user device in a configuration phase. The message addressed to $S_T$ will then look like:

$$M = \{T, S_{rs}, E(H_{Srs}, K_P) \ldots S_{tu}, E(H_{Stu}, K_P), E(K_E, K_M)\} \quad (Eq\ 4)$$

The users who are in the sets $S_{xy}$, and also have the current state key $K_{state}$ can first derive the key $K_P$. Using the function F and the state key $K_{state}$ a user can then derive $K_E = F(K_P, K_{state})$ and, finally, the media key $K_M$. Again, if the state is same time updated from T to T' the following formula applies:

$$M = \{T, S_{rs}, E(H_{Srs}, K_P) \ldots S_{tu}, E(H_{Stu}, K_P), E(K_E, T\|K'_{state}\|K_M)\} \quad (Eq\ 4')$$

Complete Message

What has been described above shows how to create an update message for users joining without having a state key and how to update users having state key. In practice, these could be combined to create one message. The users corresponding to both Eq 2 and Eq 3 may be included in one message as follows:

$$M = \{T, S_{ab}, E(H_{Sab}, K_E) \ldots S_{cd}, E(H_{Scd}, K_E), E(K_{state}, K_E), E(K_E, K_M)\} \quad (Eq\ 5)$$

Alternatively, if the state is updated to a new state:

$$M = \{T, S_{ab}, E(H_{Sab}, K_E) \ldots S_{cd}, E(H_{Scd}, K_E), E(K_{state}, K_E), E(K_E, T\|K'_{state}\|K_M)\} \quad (Eq\ 5')$$

In summary, this formula may be used to update state and state key in a group comprising joining users who do not possess the current state key and currently active users in possession of the current state key. It is noticed that the group of joining users not having the current state key may include users previously revoked but having an old state key, i.e. since the revocation of these users at least one state change has taken place.

Analogously, a full generalization of formulas 2 and 4 yields:

$$M = \{T, S_{ab}, E(H_{Sab}, K_E) \ldots S_{cd}, E(H_{Scd}, K_E), S_{rs}, E(H_{Srs}, K_P) \ldots S_{tu}, E(H_{Stu}, K_P), E(K_E, K_M)\} \quad (Eq\ 6)$$

$$M = \{T, S_{ab}, E(H_{Sab}, K_E) \ldots S_{cd}, E(H_{Scd}, K_E), S_{rs}, E(H_{Srs}, K_P) \ldots S_{tu}, E(H_{Stu}, K_P), E(K_E, T\|K'_{state}\|K_M)\} \quad (Eq\ 6')$$

Note that Eq 6 is used instead of Eq 5 when $U_R$ is non-empty (i.e., there are users to revoke among those having state key).

As indicated in these formulas, a new state and state key can be distributed together with a media key. However, in certain circumstances it is advantageous not to change state. For instance, if it is expected that only a small number of users shall join and leave, not changing the state may not add an excessive overhead. The advantage will then be that the system operates in a kind of semi stateless mode during this time.

Figure 11:
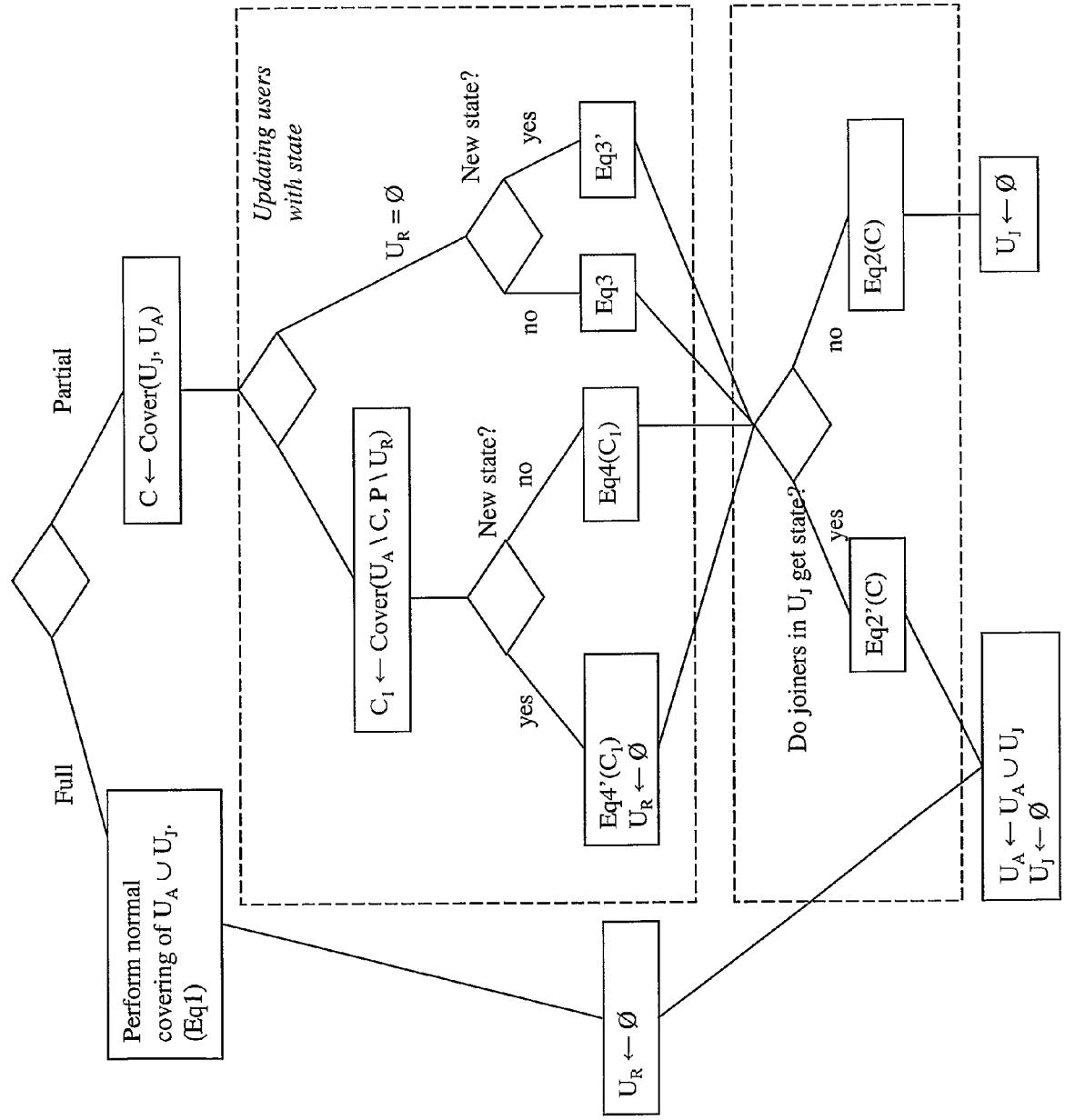
FIG. 11 is a state diagram illustrating the inventive method.

FIG. 11 is a state diagram providing a summary of the cases discussed above. In the left branch of the state diagram a full update is performed using an initialization message. As a result all users become active users and there are no revoked users $U_R$ with the current state key. The final state, as indicated in FIG. 11, comprises $U_A$ being replaced by the set $U_A \cup U_J$ and $U_J$ being set to the null set.

The right branch of the diagram corresponds to a partial update. First, a cover C is created comprising the set $U_J$ and possibly users of $U_A$. The diagram is then divided into two branches both related to users who have the current state key. The right branch corresponds to the case of no revoked users. Depending if the state is updated, Eq 3 or Eq 3' is used to update the state key for users in $U_A$. The flow goes on to consider users who do not have the state key. If, instead, the left branch is followed, i.e. $U_R \neq 0$ then a cover set $C_1$ is formed comprising the set $U_A \backslash C$ (where C in this case is seen as the set of users covered in the cover C) and possibly users of $P \backslash U_R$. Thereafter, depending if the state is updated or not, Eq(4) or Eq(4') is applied with the set $C_1$. The flow goes on to consider users not having the state key.

The lower marked part of the diagram in FIG. 11 relate to users not having the state key who shall be joined, i.e. the set $U_J$. Depending if the joining users in $U_J$ shall receive the new state key or not Eq 2 or Eq 2' is used with the set C. In case that Eq 2' is used the final state is set as in the case of the left branch of the diagram above. Otherwise, the final state comprises setting $U_J$ to the null set.

In an alternative embodiment the key server maintains several states and, for each state, the corresponding key structure and the sets $U_R$, $U_A$ and $U_J$.

A user may fall out of synchronization. To mitigate this problem, a mechanism for re-synchronization on request by the user can be provided. Exemplary, the latest state can be requested from a specified location. Alternatively, a re-initialization mechanism can be applied at regular intervals. Still another possibility is to publish all key management messages at a public location from where a user can search the information that is needed.

Having thus described a first aspect of the invention wherein a state and state key has been introduced and wherein Eq 6 discloses an exemplary form of an update message, we now turn to a second aspect of the invention.

Optimized Subset Cover Calculation

According to a second aspect a method is advised for creation of the sets $S_{rs} \ldots S_{tu}$ in an optimal manner to reduce the size of the update message. It is worth noticing that as a state key is used, part of the tree is more or less undefined. When creating the minimal subsets, this can be taken advantage of. Sometimes it may be an advantage to see these undefined parts as "revoked" users and sometimes it is better to view it as "active users" (dependent on how they are distributed in the tree).

Generally, methods of identifying the subsets in subset cover algorithms assume that the tree is well balanced, i.e. all leaves are located at about the same depth in the tree, and that it is unambiguously defined which leaves are revoked and which are users. This means e.g. that there are no undefined leaves. As noted before the use of a state key, according to the present invention, enables creation of two independent trees that are not fully balanced. If the general algorithm of identifying the subsets is used there must be a method to create a well-defined and also optimized tree. Otherwise, a new method must be invented which can create a cover directly on the tree with undefined leaves. Such a method, for trees when SD is used as the underlying scheme is disclosed. In the following, embodiments are disclosed that achieve this based on a tree representing users who posses the state key. However, the method works equally well on a tree representing users who do not possess the state key, i.e. the corresponding nodes are undefined. In fact, the methods described in the following can be used to generate a cover of nodes of a certain type, e.g. active, revoked or undefined.

Generally, the methods described below comprise two steps. In a first step users are marked according to a specific algorithm. A second step comprises a combination of subset calculation and marking of users and nodes, i.e. previous marking of users may be changed in this step.

Figure 5B:
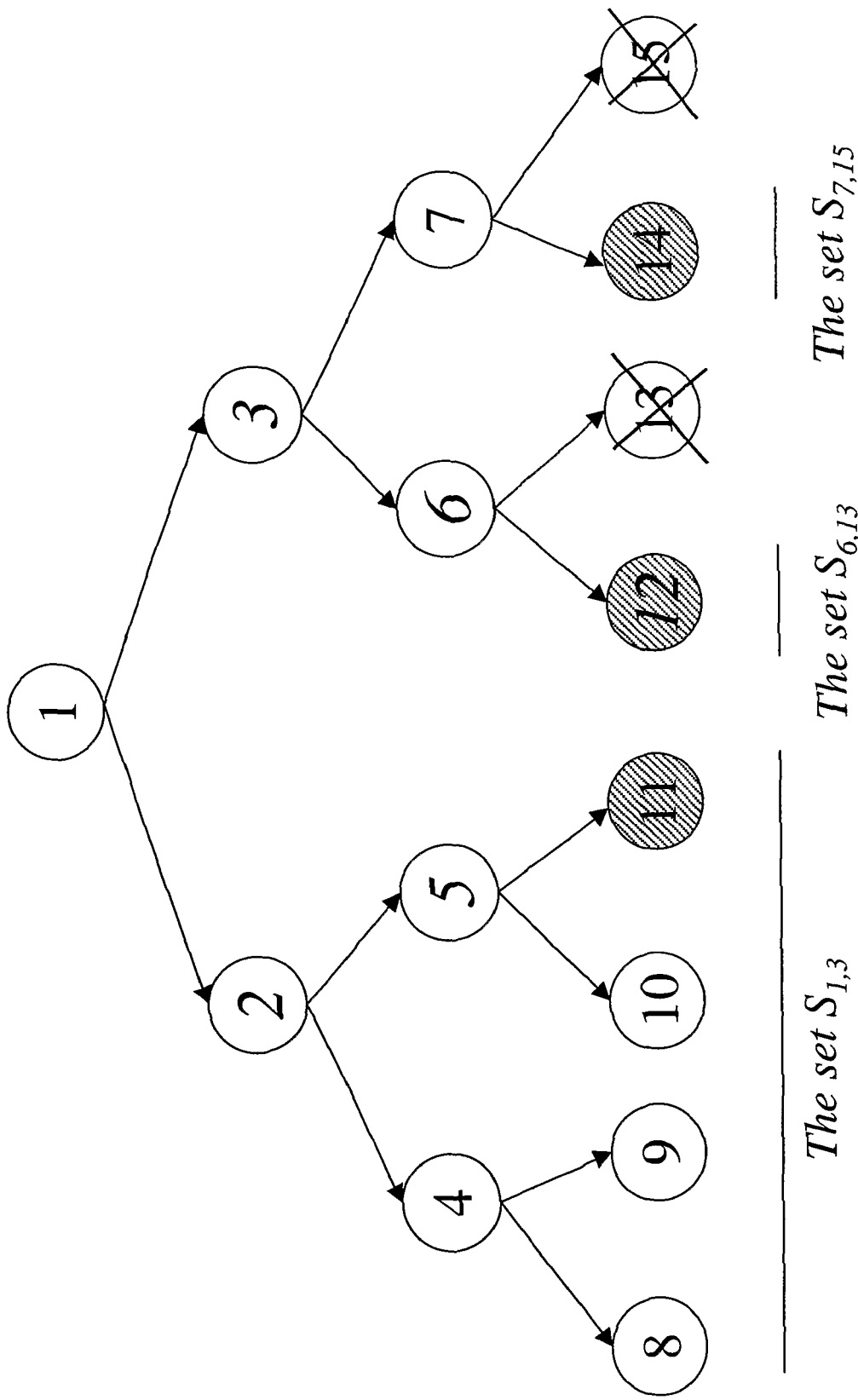

According to a first embodiment a normal tree is created in the first step and all users without state key are marked as active users of the group. By doing so it will then be easy to calculate, in the second step, the subsets using a general cover method. To see this, consider FIG. 5B where leaves 8, 9, 10, 13, and 15 have the state key tree, and leaves 11, 12, and 14 do not have the state key. According to the first step, leaves 11, 12, and 14 are marked as active. In FIG. 5B leaves are shown shadowed to remind that they do not have the current state. If we want to revoke leaves 13, and 15 (marked with a cross in FIG. 5B), the general algorithm would have created the sets $S_{1,3}$ to cover all leaves in the left branch of the root, $S_{6,13}$ to cover leaf 12, and $S_{7,15}$ to cover leaf 14. A key update message of the form Eq. 4 or Eq. 4' is used. It is then noticed that leaves 11, 12, and 14 although covered by the sets specified above still will not be able to retrieve the new key as these leaves do not have the current state key.

The sets created according to this embodiment are not optimal. The optimal subset would have been the subset $S_{2,11}$ only whereby leaves 8, 9, 10 would have been updated, leaf 11 unaffected and leaves 13, 15 revoked not being included in the cover set.

According to a second embodiment said second step comprises post-processing of the subsets $S = \{S_{rs} \ldots S_{tu}\}$ created according to the first step of the first embodiment. Thus, according to the second embodiment the set $S_{ij} \in S$ is removed from S if all leaves under $S_{ij}$ are undefined in the original tree. Thus, in the example above, the sets $S_{6,13}$ and $S_{7,15}$ are deleted in the post-processing resulting in a near optimal cover (it uses an optimal number of subsets, but it needlessly covers an undefined user). Reducing the number of undefined users covered reduces the risk of revoked users being able to cooperate, retrieving the key illegally.

According to a third embodiment said first mark-up step, comprises marking the leaves according to the following rules:

All leaves without state key are marked undefined.
All leaves with state key are either marked user or not user as is the case.

Figure 5C:
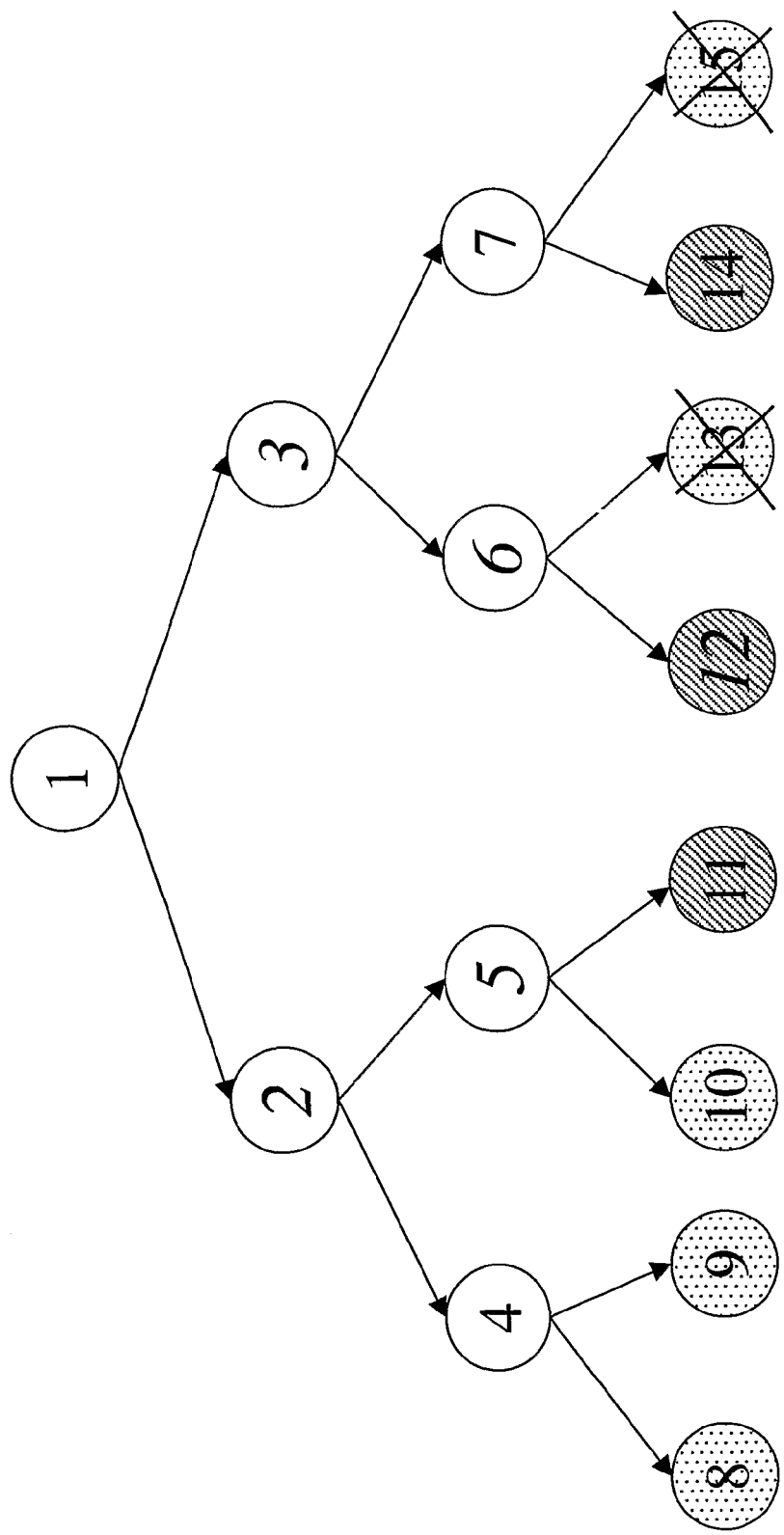

In FIG. 5C the undefined leaves are marked with lines and leaves with a state key are marked with dots. Further, in FIG. 5C, leaves 13 and 15 are cross-marked to indicate that these leaves shall not be users.

Said second combined marking and calculation step comprises the following algorithm applied to a tree as illustrated in FIG. 5C:

For each level in the tree, starting from the leaves, go one level up in the tree and for each node at that level do the steps:
a. If both the left and right child are marked as undefined, mark the node as undefined,
b. If one child, denoted x, is marked as undefined but the other child, denoted y, is either marked user or not user then mark the node as y and mark all leaves under x as y,
c. If none of the children are marked undefined, mark the current node as user.

Following this algorithm all leaves will be marked either user or not user. Thus, previously undefined users will be re-marked and defined. In the example FIG. 5C, according to step 2, leaves 8, 9, and 10 are marked as users, leaves 11, 12, and 14 are marked undefined, and leaves 13 and 15 are marked not users.

There are no nodes affected by sub step a. According to sub step b node 5 is marked as user and nodes 6, 7 are marked not user. Further, according to this sub step, leaves 12 and 14 are marked not user and leaf 11 is re-marked user. According to sub step c node 4 is marked user. In the following steps, only sub step c applies and nodes 1, 2 and 3 will be marked user without any impact on the leaves. A cover is now created that covers the users only. According to the example FIG. 5C, the set $S_{1,3}$ will result. As is seen, the resulting cover in this case is near optimal. The cover is optimal in the number of subsets used, but it unnecessarily covers an undefined leaf (11).

According to a fourth embodiment, the post processing according to the second embodiment is first performed and the algorithm according to the third embodiment is thereafter performed.

According to a fifth embodiment a more efficient method of creating the subset covering is disclosed that leads to an optimal cover. This method is based on a coloring algorithm where nodes are given different colors depending on the status of the node. According to this embodiment, said first step involves coloring the leaves. A leaf is colored "red" if it shall be revoked in the current update process, i.e. it belongs to the set $U_R$. A leaf is colored "black" if it is already revoked and does not have the current state key, i.e. it belongs to the set $U_O$. Finally, a leaf is colored "blue" if it shall remain user of the group in the current update i.e. it belongs to the set $U_A$. It follows that leaves can only have one of these colors.

Figure 12:
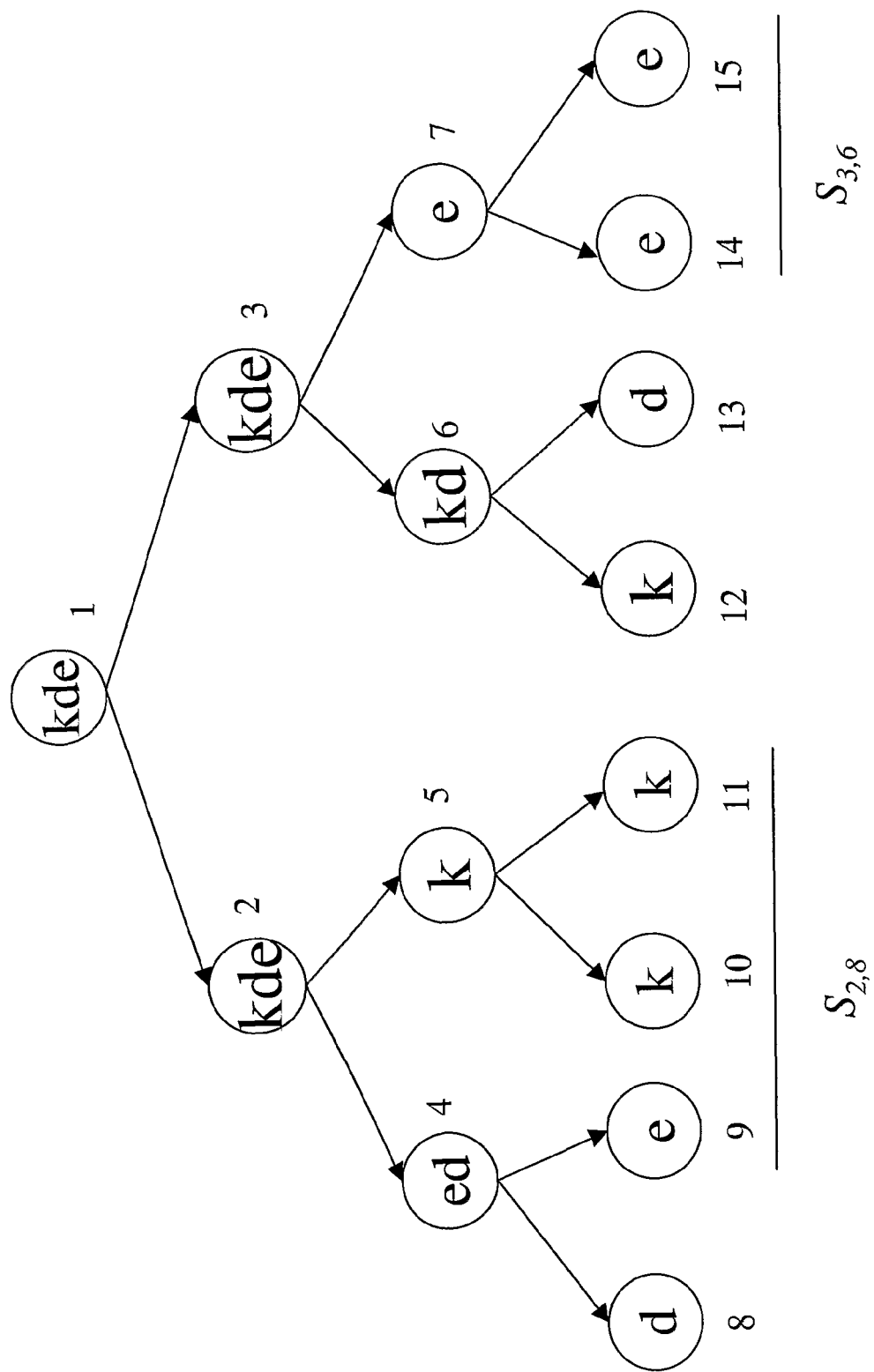
FIG. 12 illustrates a preferred embodiment according to the invention for creation of subsets.

Thereafter the combined marking and calculation second step is performed. The marking proceeds according to the following rules. Nodes are colored that are above the bottom level. The colors of the children are basically "added" to make up the color of the parent. If at least one child is red, the parent will be red, if at least one child is blue, the parent will be blue. Blue and red signify the existence of a leaf below the node that must be covered or must not be covered, respectively. The parent will have the sum of black of both children (the amount of black in a node represents how many undecided leaves can be revoked below that node) if neither child has a blue color, or the maximum of the black of the children otherwise. The coloring process proceeds through all levels from the bottom up (this could also be implemented with a depth-first traversal of the tree). FIG. 12 illustrates an example of a colored tree. Here "k, d, e" respectively indicates the colors "black, red, blue".

We now turn to explain the calculations that are included in the second step. In order to better understand the algorithm a definition is first made. A red thread is defined as a path originating in a node colored red and including nodes at lower levels that are all colored red. The top node of a thread is the highest node colored red and having only one red colored sibling. In FIG. 12 the nodes 2, 4, and 8 forms a thread, i.e. node 2 is the top node. A top node of a red thread that is also colored blue indicates that a subset must be used to cover the blue leaf (or leaves) below that node.

The algorithm searches for red threads with blue top nodes and, when it finds such a red thread, calls the function Findset( ) to build the cover set needed. The parent node of the top node of the thread is then colored with only red (i.e. the normal propagation of blue and black is stopped there) after which coloring of the remaining tree proceeds as normal. The principle for the Findset( ), illustrated as pseudo code in FIG. 9, algorithm is to work down from the top of the red thread, following blue nodes, until it reaches a point where both children are colored blue. When such a node is found, which can often be the top of the red thread, the algorithm notes that this must be the top node of the subset (a special case is needed, should the node it reached be only blue, with neither black nor red present).

It then proceeds to follow any red down from the newly found top node, until it reaches a node without blue, which must be the root of the excluded sub tree. If no red is present, it will instead attempt to maximize the number of excluded undecided users, and follow the largest number of black down, again until it gets to a node that has no blue present. Then this node will be the root for the excluded sub tree.

In FIG. 11 there are two threads of the type described. Nodes 2 and 3 are the respective top nodes of these threads. Following the left thread we note that not both children are blue, so we move down the root to node 4. From node 4, we find that the first node which is not colored blue as we follow the red thread down is node 8, so that will be the root of the excluded sub tree. Accordingly, the set $S_{4,8}$ is added to the cover. In the same way for the right thread, the root will become node 3 and node 6 will be the first node reached where no blue is present, making it the root of the excluded sub tree. The result is that the set $S_{3,6}$ is also added to the resulting cover.

According to the algorithm, the colors "red" and "blue" are represented as Boolean values and the color "black" is represented as an integer. Alternatively, the color "black" is also represented as a Boolean value though this would not give an optimal subset cover in the sense that it may cover more black nodes than what is strictly needed. It is worth noting, however, that with that modification, it will still never use a larger number of sets for the cover so both methods are optimal from a bandwidth point of view.

The algorithm is described in FIG. 10. The cover function Cover ( ) illustrated in FIG. 10 creates the complete subset cover for a tree, given a tree where the leaves have been colored by "blue", "red", and "black" according to the principles explained above. The function Cover( ) makes use of a sub function Findset( ), illustrated in FIG. 9, that derives a as small set as possible to cover the sub tree rooted in the given node i.e. it covers the tree by covering as few "black" and "red" nodes as possible. The function returns the indexes of the subsets $S_{x,y}$. In FIG. 10 "root" designates the root node of the tree. This node is never updated. As said before, the color black is represented as an integer and the sum "+" in the algorithm is the normal sum of integers. The remaining syntax elements are self-explanatory and well known in the art.

In an alternative embodiment, the color black is also represented as a Boolean value. In this case, the calculation in FIG. 10 of n.black is modified as: n.black=left(n).black|right (n).black.

Multiple Services

The previously described preferred embodiments are convenient for management of keys related to a specific service.

Figure 13:
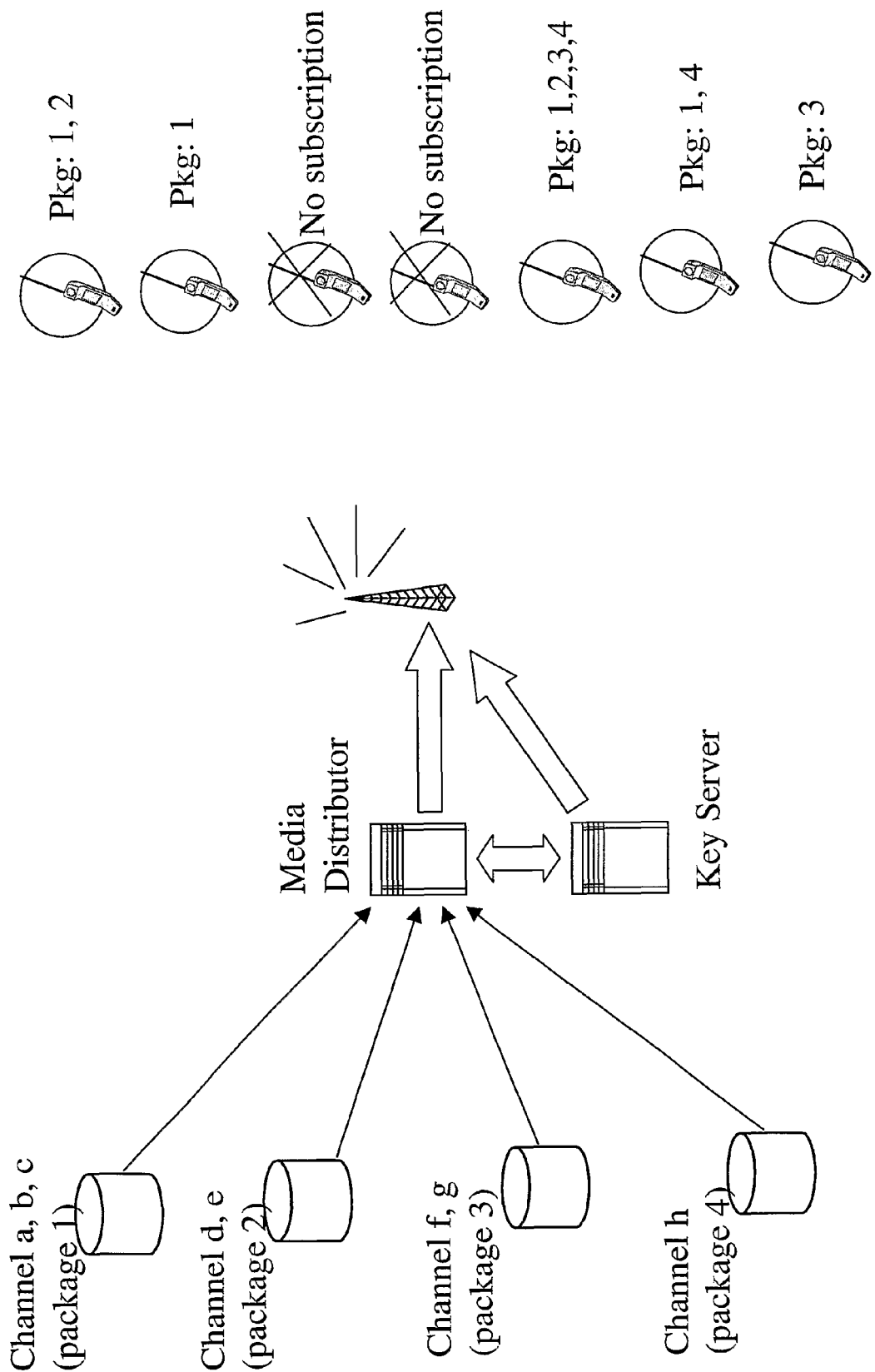
FIG. 13 illustrates a preferred embodiment according to the invention related to multiple services.

However, it is common that a user subscribes to a plurality of services. The described embodiments of the invention can be used for each such service to manage the keys and key management messages. A key identifier can be used to associate a key with a corresponding service. Apparently, this straightforward approach would result in numerous key management messages. Further, it is not obvious how to introduce state dependency in a scheme for multiple services with different user status groups. Therefore, according to another embodiment of the invention, an extension of the proposed system is disclosed for managing the distribution of keys in the case of multiple simultaneous services and where the services may have different subscribing users. An example of this type of service is shown in FIG. 13. A number of service packages, Service Package 1-4, are shown. Each package is distributed on one or several distribution channels, Channel a-h, as indicated in the Figure. The channels may relate to e.g. broadcast channels exemplary identified by frequency. To the right is shown seven subscribers to different service packages. Two of the illustrated users do not subscribe to any service packages and are shown crossed to indicate that they shall not take part in any key update process. A Media Distributor compiles service packages for each subscribing user and encrypts the packages using the appropriate media key obtained from a Key Server.

According to this embodiment in addition to the state T, as previously described and hereinafter also referred to as the main state, each service package (i), is assigned a service specific state defined as $T_{P_i}$ and a corresponding state key $K_{T_{P_i}}$. Each state $T_{P_i}$ defines a corresponding tree structure as previously described. Note that the same SD tree may be utilized for all service packages. Users are added to and revoked from a specific service using the corresponding tree structure. Users may also be revoked using the main state key. This will then have the effect that a user will be revoked from all services it subscribes to.

Figure 14:
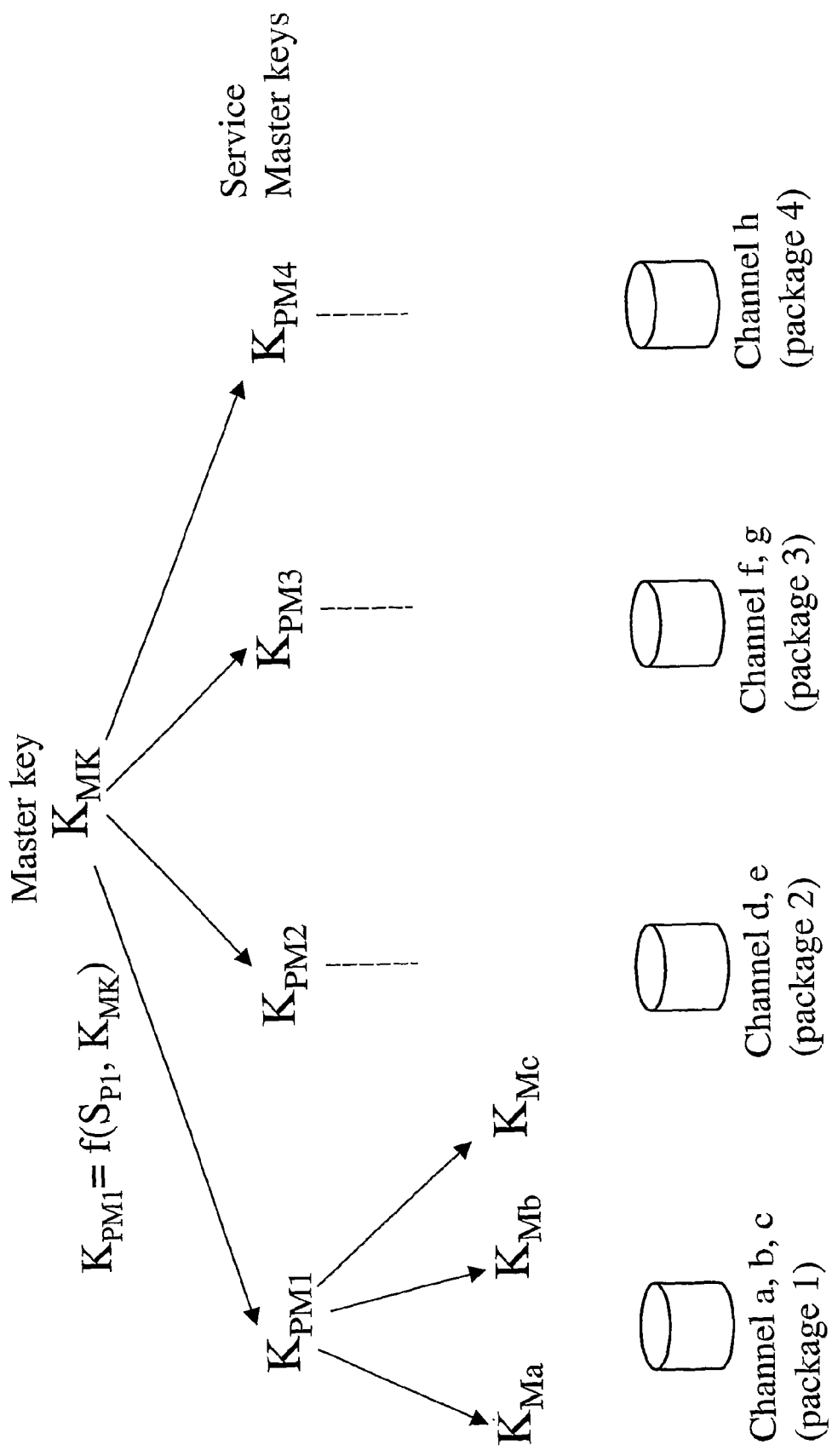
FIG. 14 illustrates key management according to the invention in case of multiple services.

The media keys for the specific services are distributed and protected both under the main state key T and also under the appropriate service state key $T_{P_i}$. In an alternative embodiment in order to improve efficiency, the media keys are derived, applying a function f, from a master key and a service package seed. With reference to FIG. 14, a one-way function f, such as a hash function, is applied to a seed SP1 and the master key KMK to generate a service media master key KPM1 corresponding to the first service. The other available services are analogous. From these service package master keys further keys KMx (x=a–h) may be generated for each channel. The derivation of these channel keys can be analogous to the generation of the service package master keys, i.e., by using a function f on KPMx and a seed. In this way, only one key $K_{MK}$ needs to be transmitted during the re-keying. It should be noted that the seed(s) and the function f must be agreed upon before such re-keying can take place. This could for instance be done during the initial registration of the service.

Alternative Embodiments

According to the invention, means are preferably included to register users that already have been revoked and their state and state key at the time for revocation. In an alternative embodiment a system parameter preferably determines the depth of this history registration i.e. the maximum number of states T that should be maintained in the register.

The embodiments described above are merely given as examples, and it should be understood that the present invention is not limited thereto. Further modifications, changes and improvements that retain the basic underlying principles disclosed and claimed herein are within the scope and spirit of the invention.

REFERENCES

[1] International Patent Application WO-200260116 (LOTSPIECH J B; NAOR D; NAOR S).
[2] *Probabilistic Optimization of LKH-based Multicast Key Distribution Schemes*, A. Selcuk et al., Internet draft January 2000, http://www.securemulticast.org/draft-selcuk-probabilistic-lkh-00.txt.
[3] U.S. Pat. No. 5,748,736.
[4] *Key Management for Secure Multicast Group Communication in Mobile Networks*, T. Kostas et al., http://nevelex.com/downloads/discex.pdf.

The invention claimed is:

1. A method for improved key distribution in a broadcast data communication system for selective access to services, wherein a group key management message, including a service access key, is transferred to a group of users for access to a selected service, said method comprising:
creating a set of encryption keys based on a stateless subset cover scheme, each user being associated with a leaf in said stateless subset cover scheme;
establishing a state key and a corresponding state representing a subset of users that have the state key and a subset of users that do not have the state key;
determining a subset cover based on information representative of the established state; and
determining said group key management message at least partly based on the determined subset cover, wherein said group key management message M is determined according to:

$$M=\{T,S_{rs},E(H_{Srs},K_P) \ldots S_{tu},E(H_{Stu},K_P),E(K_E,K_M)\},$$

$$K_E=F(K_P,K_{State})$$

where T is a state identifier, $K_{state}$ is the current state key, $S_{rs}, \ldots, S_{tu}$ are user sets covering users that shall remain active among those users which have the state key, E is an encryption function, $H_{Srs}, \ldots H_{Stu}$, are encryption keys of the stateless subset cover scheme corresponding to said user sets, $K_P$ is said additional key, $K_E$ is an envelope key calculated as a function F of Said additional key and the state key, and $K_M$ is the information protection key; and
the broadcast data communication system transferring said group key management message to the group of users for access to the selected service.

2. The method of claim 1, wherein said step of determining a group key management message comprises the step of determining a first message part extractable by a sub-group of users which have the state key.

3. The method of claim 2, wherein the sub-group of users that have the state key comprises users that have the state key and shall remain active.

4. The method of claim 2, further comprising the steps of:
protecting an information protection key at least partly based on the state key; and
incorporating said protected information protection key into said group key management message.

5. The method of claim 4, wherein said step of protecting an information protection key is based on the state key as well as an additional key, wherein said additional key is protected based on encryption keys of a subset cover of users which shall remain active and incorporated in protected form into said first part of said group key management message.

6. The method of claim 4, wherein said information protection key as well as a new state key are protected at least partly based on the current state key, and said protected new state key is also incorporated into said group key management message.

7. The method of claim 2, wherein said step of determining a group key management message further comprises the step of determining a second message part extractable by a sub-group of users which do not have the state key.

8. The method of claim 7, wherein the sub-group of users that do not have the state key comprises users to be joined as active users.

9. The method of claim 7, wherein said state key and a media protection key are protected based on encryption keys of a subset cover of users to be joined as active users and incorporated in protected form into said second part of said group key management message.

10. The method of claim 1, wherein said step of determining a subset cover comprises the steps of:
  marking users based on said state information; and
  computing said subset cover based on said user markings.

11. The method of claim 10, wherein said step of marking users based on said state information comprises the step of marking users without the state key as active users, and said computing step involves using a general subset cover calculation procedure.

12. The method of claim 10, wherein said step of marking users based on said state information is performed based on a categorization of users into three types:
  users that have the state key but shall be revoked;
  users that have the state key and shall remain active; and
  users without the state key.

13. The method of claim 12, wherein said step of marking users based on said state information comprises the steps of:
  initially marking users without the state key as undefined users;
  marking each user with the state key as one of: a user that shall remain active, referred to as a member, and a user that shall be revoked, referred to as not a member; and
  remarking each undefined user as one of:
    a member and not a member, depending on the previous marking of users with the state key.

14. The method of claim 10, wherein said step of marking users based on said state information and said step of computing said subset cover based on said user markings are performed simultaneously in an integrated manner.

15. The method of claim 14, wherein said integrated marking and computing steps are performed based on a categorization of users into three types:
  users that have the state key but shall be revoked;
  users that have the state key and shall remain active; and
  users without the state key.

16. The method of claim 15, wherein colors are assigned to users depending on said categorization, and said integrated marking and computing steps are performed according to a coloring algorithm.

17. The method of claim 1 wherein the group key management message includes a plurality of keys for access to a plurality of services, wherein:
  said step of establishing further comprises establishing, for each of the plurality of services, a service state key and corresponding state representing a subset of users that have the service state key and a subset of users that do not have the service state key;
  said step of determining a subset cover further comprises determining, for each of the plurality of services, a service subset cover based on information representative of the established service state;
  said step of determining said group key management message comprises determining, for each service, a component of the management message at least partly based on information representative of said established service subset covers; and further comprising the step of
  combining said components for forming said group key management message.

18. An arrangement for improved key distribution in a system for selective access to services, wherein a group key management message is transferred to a group of users, said arrangement comprising:
  means for creating set of encryption keys based on a stateless subset cover scheme, each user being associated, with a leaf in said stateless subset cover scheme;
  means for establishing at least a state key and a corresponding at least a state representing a subset of users that have the at least a state key and a subset of users that do not have the at least a state key;
  means for determining at least a subset cover based on information representative of the established at least a state; and
  means for determining at least part of said group key management message at least partly based on the determined said at least a subset cover, wherein said means for determining a group key management message is operable to determine at least a message part M according to:

$$M = \{T, S_{rs}, E(H_{Srs}, K_P) \ldots S_{tu}, E(H_{Stu}, K_P), E(K_E, K_M)\},$$

$$K_E = F(K_P, K_{state})$$

where T is a state identifier, $S_{rs}, \ldots, S_{tu}$ are user sets covering users which shall remain active among those users which have said at least a state key, E is an encryption function, $H_{Srs}, \ldots H_{Stu}$, are encryption keys of the stateless subset cover scheme corresponding to said user sets, $K_P$ is said at least an additional key, $K_E$ a corresponding envelope key calculated as a function F of said additional key and said main state key, and $K_M$ is a service protection key; and
  means for transferring said group key management message to the group of users.

19. The arrangement of claim 18, wherein said means for determining a group key management message comprises means for determining a first message part extractable by a sub-group of users which have said at least a state key.

20. The arrangement of claim 19, wherein the sub-group of users that have said at least a state key comprises users that have said at least a state key and shall remain active.

21. The arrangement of claim 19, further comprising:
  means for protecting at least a service protection key at least partly based on said at least a state key; and
  means for incorporating said protected at least service protection key into said group key management message.

22. The arrangement of claim 21, wherein said means for protecting an at least a service protection key is operable for protecting said at least a service protection key based on said at least a state key as well as at least an additional key, wherein said at least an additional key is protected based on encryption keys of a subset cover of users which shall remain active and incorporated in protected form into said first part of said group key management message.

23. The arrangement of claim 21, wherein said at least a service protection key as well as a new state key are protected at least partly based on said main state key, and said protected new state key is also incorporated into said group key management message.

24. The arrangement of claim 19, wherein said means for determining a group key management message further comprises means for determining a second message part extractable by a sub-group of users which do not have the at least a state key.

25. The arrangement of claim 24, wherein the sub-group of users that do not have the at least a state key comprises users to be joined as active users.

26. The arrangement of claim 25, further comprising means for protecting said at least a state key and a service protection key based on encryption keys of a subset cover of users to be joined as active users and means for incorporating them in protected form into said second part of said group key management message.

27. The arrangement of claim 18, wherein said means for determining a subset cover comprises:
means for marking users based on said state information; and
means for computing said subset cover based on said user markings.

28. The arrangement of claim 27, wherein said means for marking users based on said state information comprises means for marking users without the at least a state key as active users, and said computing means operates according to a general subset cover calculation procedure.

29. The arrangement of claim 27, wherein said means for marking users based on said state information is operable to mark users based on a categorization of users into three types:
users that have the at least a state key but shall be revoked;
users that have the at least a state key and shall remain active; and
users without the at least a state key.

30. The arrangement of claim 29, wherein said means for marking users based on said state information comprises:
means for initially marking users without the at least a state key as undefined users;
means for marking each user with the at least a state key as one of
a user that shall remain active, referred to as a member, and
a user that shall be revoked, referred to as not a member; and
means for re-marking each undefined user as one of: a member and not a member, depending on the previous marking of users with the at least a state key.

31. The arrangement of claim 27, wherein said means for marking users based on said state information and said means for computing said subset cover based on said user markings are configured to operate simultaneously in an integrated manner.

32. The arrangement of claim 31, wherein said integrated operation of marking and computing is based on a categorization of users into three types:
users that have the at least a state key but shall be revoked;
users that have the at least a state key and shall remain active; and
users without the at least a state key.

33. The arrangement of claim 32, further comprising means for assigning colors to users depending on said categorization, and wherein said integrated operation of marking and computing is performed according to a coloring algorithm.

34. The arrangement of claim 18, wherein said arrangement is implemented at a key server.

35. The arrangement of claim 18, further comprising:
means for transmitting to an identified user a subset of the set of encryption keys a state identifier, and a state key.

36. The arrangement of claim 35, further comprising means for receiving and storing said subset, state identifier, and state key.

37. The arrangement of claim 36, wherein the means for receiving and storing is implemented at a user terminal unit.

38. A method for improved key distribution in a broadcast data communication system for selective access to services, wherein a group key management message, including a service access key, is transferred to a group of users for access to a selected service, said method comprising:
creating a set of encryption keys based on a stateless subset cover scheme, each user being associated with a leaf in said stateless subset cover scheme;
establishing a state key and a corresponding state representing a subset of users that have the state key and a subset of users that do not have the state key;
determining a subset cover based on information representative of the established state; and
determining said group key management message at least partly based on the determined subset cover further comprises:
determining a first message part extractable by a sub-group of users which have the state key include comprises users that shall remain active;
protecting an information protection key at least partly based on the state key based on the state key as well as an additional key, wherein said additional key is protected based on encryption keys of a subset cover of users which shall remain active and incorporated in protected form into said first part of said group key management message; and
incorporating said protected information protection key into said group key management message,
wherein said group key management message M is determined according to:

$$M = \{T, S_{rs}, E(H_{Srs}, K_P) \ldots S_{tu}, E(H_{Stu}, K_P), E(K_E, K_M)\},$$

$$K_E = F(K_P, K_{State})$$

where T is a state identifier, $K_{state}$ is the current state key, $S_{rs}, \ldots, S_{tu}$ are user sets covering users that shall remain active among those users which have the state key, E is an encryption function, $H_{Srs}, \ldots H_{Stu}$, are encryption keys of the stateless subset cover scheme corresponding to said user sets, $K_P$ is said additional key, $K_E$ is an envelope key calculated as a function F of Said additional key and the state key, and $K_M$ is the information protection key; and
the broadcast data communication system transferring said group key management message to the group of users for access to the selected service.

* * * * *